F. W. SCHWINN.
COMPENSATING SPROCKET.
APPLICATION FILED AUG. 3, 1917.

1,254,542. Patented Jan. 22, 1918.

Witnesses:
Inventor:
Frank W. Schwinn

UNITED STATES PATENT OFFICE.

FRANK W. SCHWINN, OF CHICAGO, ILLINOIS.

COMPENSATING SPROCKET.

1,254,542.  Specification of Letters Patent.  Patented Jan. 22, 1918.

Application filed August 3, 1917. Serial No. 184,183.

*To all whom it may concern:*

Be it known that I, FRANK W. SCHWINN, a citizen of the United States, residing at Chicago, in the county of Cook and State of Illinois, have invented new and useful Improvements in Compensating Sprockets, of which the following is a specification.

My invention relates to improvements in compensating power transmission devices, and more particularly to a form of driving sprocket including compensating mechanism.

The invention will be fully understood from the following detailed description taken in connection with the accompanying drawing, in which—

Figure 1:
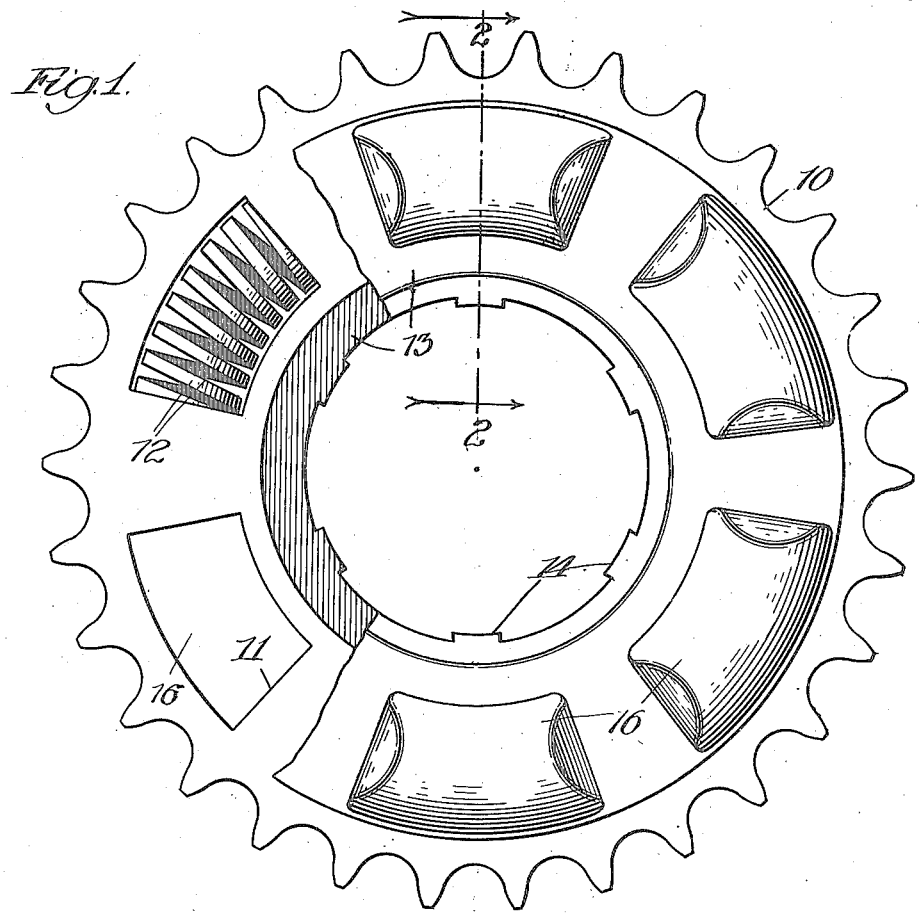
Figure 2:
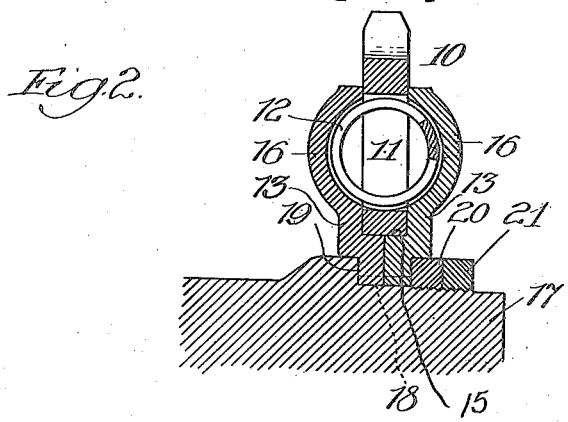

Figure 1 is a side elevation of one form of compensating sprocket constructed in accordance with my invention, part of the housing being broken away, and Fig. 2 is a section on the line 2 of Fig. 1, and showing the sprocket mounted upon a driving shaft, or hub.

Referring more particularly to the drawings, the numeral 10 designates the sprocket proper, which is of the usual annular form, of uniform thickness throughout, and somewhat larger in diameter than the shaft or hub upon which it is to be mounted. The central body-portion of the sprocket is cut out to form a plurality of spaced sector-shaped apertures 11, of which six are illustrated in the present embodiment of the invention. Within each of these apertures there is mounted a helical compression-spring 12, the normal axial length of which somewhat exceeds the length of the sector-shaped aperture in which it is fitted, so that the spring must be subjected to a greater or less degree of compression, in order to fit it into the aperture.

The sprocket structure is completed by a pair of complementary side plates designated 13, and which at their inner circumference form the hub-portion of the sprocket, being provided with keys 14, or the like means, for securing the sprocket structure on a shaft or vehicle hub. Outside of the inner or hub-portion of the plates 13 they are shouldered as at 15, to form a cylindrical bearing surface for the sprocket 10, which is confined between them in the manner shown in Fig. 2. Each side plate further has a concavo-convex boss, designated 16, arranged opposite each of the sector-shaped apertures 11 and serving to receive the projecting side-portion of the corresponding spring 12. In the assembled sprocket, therefore, the six concavo-convex bosses of each side plate 13 form, with the complementary bosses of the opposite plate, sector-shaped pockets, which house the compression-springs 12, these pockets being of the same length as the apertures 11, or of a little less length.

The parts of the sprocket are held in their assembled position by the sprocket-mounting, which may, for example, be of the type shown in Fig. 2, in which there is illustrated a shaft 17 having key-ways 18 in its threaded end and provided with a collar, or shoulder, 19, at the inner limit of the threads. The sprocket is mounted on this threaded end and secured in position by a nut and lock-nut 20, 21, respectively, which hold the side plates 13 in their proper spaced relationship, thereby maintaining the entire structure in assembled position.

The compensating sprocket described is particularly useful in connection with chain-driven motor-cycles, for the purpose of relieving the shocks upon the driving chain and smoothing out the torque variations due to the intermittent power-impulses of the engine.

It will be seen that the sprocket-member proper, that is the toothed annulus 10, imparts its torque to the driven shaft 17 only through the six helical springs 12, the cushioning effect of which is, therefore, effective to relieve the strain upon the chain.

According to whether it is desired to cushion all shocks or only the heavier shocks, the springs 12 may be set into their respective recesses either without any previous compression or with any predetermined degree of initial compression. If, for example, each spring 12 is set into its recess with an initial compression of fifty pounds, then no cushioning effect whatever will be exercised until the torque exceeds 300 pounds at the radius of the center lines of the springs, the sprocket acting as a rigid sprocket under less strain.

It will be seen that by the sprocket construction described the compensating action is fully reversible, there being no difference whatever in the operation of the device under right-hand or left-hand torque.

It is further to be noticed that in addition to forming housing members which retain lubricant in and exclude dust from the working surfaces of the sprocket, the side-plates 16 are further capable of acting as dampening devices, damping out any oscillations of the springs. This effect may be obtained to any desired degree by adjustment of the nut 20 and lock-nut 21 through which the side-plates are brought into frictional engagement with the faces of the sprocket-annulus 10.

While I have shown and described in considerable detail one specific embodiment of my invention, it is to be understood that this is illustrative only and for the purpose of making the invention more clear, and that I do not regard the invention as limited to the illustrated details, nor to any of them, except in so far as such limitations are included within the terms of the following claims, in which it is my intention to claim all novelty inherent in my invention as broadly as is permissible, in view of the prior art.

What I claim is:

1. A compensating sprocket comprising a toothed annulus having a plurality of sector-shaped apertures therein, helical compression springs arranged in said apertures with their axes lying along the circumferential center lines of the apertures, said springs having a diameter exceeding the thickness of the sprocket, a pair of side plates sandwiching said toothed annulus between them and having recesses in their inner faces adapted to receive the projecting portions of said springs and to form end abutments for the same, and means for securing said side plates upon a driven member.

2. A compensating sprocket comprising a toothed annulus having a plurality of sector-shaped apertures therein, helical compression springs arranged in said apertures with their axes lying along the circumferential center lines of the apertures, said springs having a diameter exceeding the thickness of the sprocket, a pair of annular side plates sandwiching said toothed annulus between them and having recesses in their inner faces adapted to receive the projecting portions of said springs and to form end abutments for the same, and having cylindrical bearing surfaces constituting bearings for the said toothed annulus, and means for securing said side plates upon a driven member.

3. A compensating sprocket comprising a toothed annulus having a plurality of sector-shaped apertures therein, helical compression springs arranged in said apertures with their axes lying along the circumferential center lines of the apertures, said springs having a diameter exceeding the thickness of the sprocket and a normal length exceeding the length of said apertures, a pair of side plates sandwiching said toothed annulus between them and having recesses in their inner faces adapted to receive the projecting portions of said springs and to form end abutments for the same, and means for securing said side plates upon a driven member.

4. A compensating sprocket comprising a toothed annulus having a plurality of sector-shaped apertures therein, helical compression springs arranged in said apertures with their axes lying along the circumferential center lines of the apertures, said springs having a diameter exceeding the thickness of the sprocket, a pair of side plates bearing upon the faces of said toothed annulus and sandwiching the same between them, said plates having recesses in their inner faces adapted to receive the projecting portions of said springs and to form end abutments for the same, means for causing said side plates to frictionally engage the faces of said toothed annulus, and means for securing said plates upon a driven member.

FRANK W. SCHWINN.